Nov. 28, 1967     F. L. DODD     3,355,037
CARGO UNLOADING DEVICE
Filed Aug. 1, 1966     3 Sheets-Sheet 1
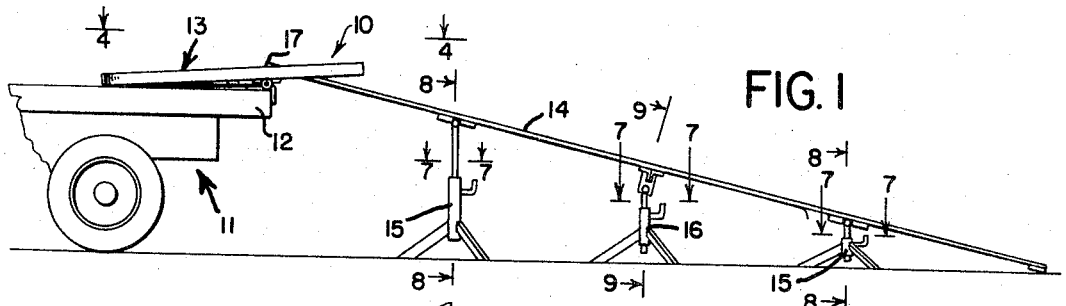
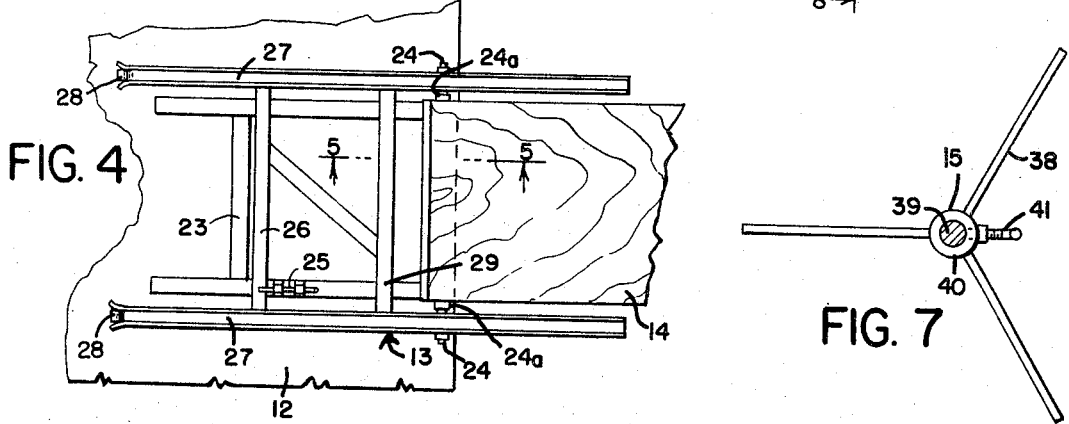
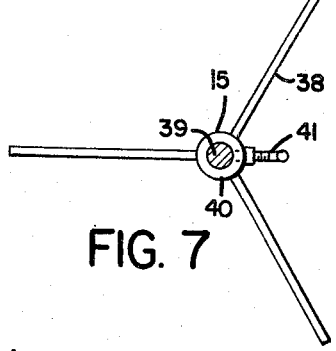
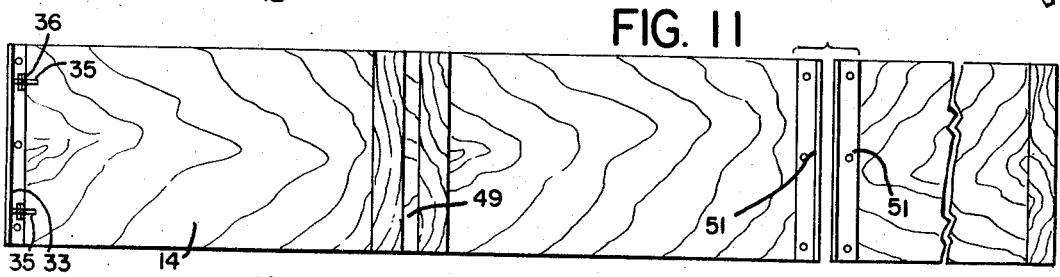
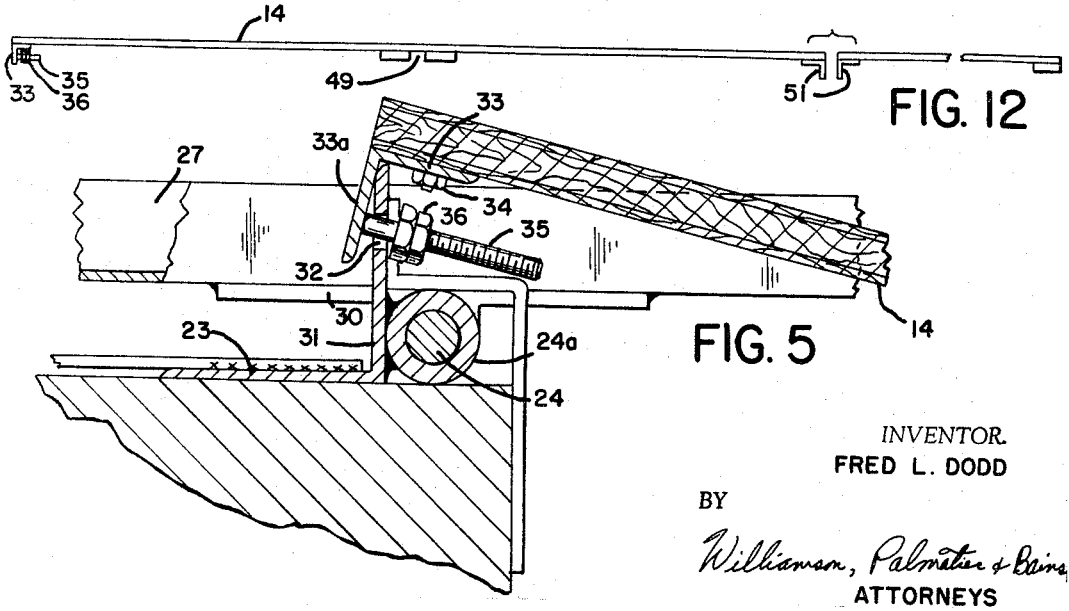
INVENTOR.
FRED L. DODD
BY
Williamson, Palmatier & Bains
ATTORNEYS

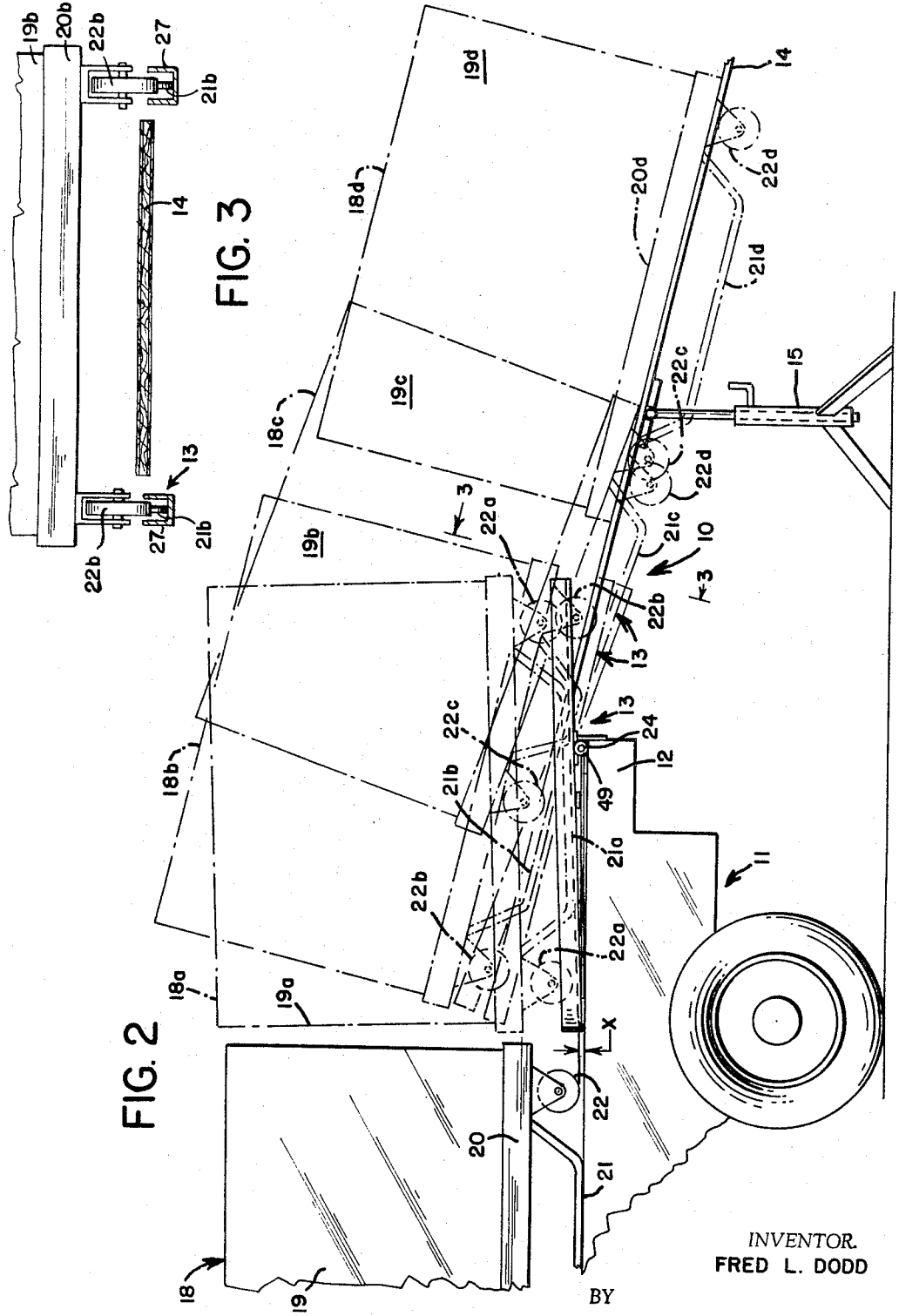

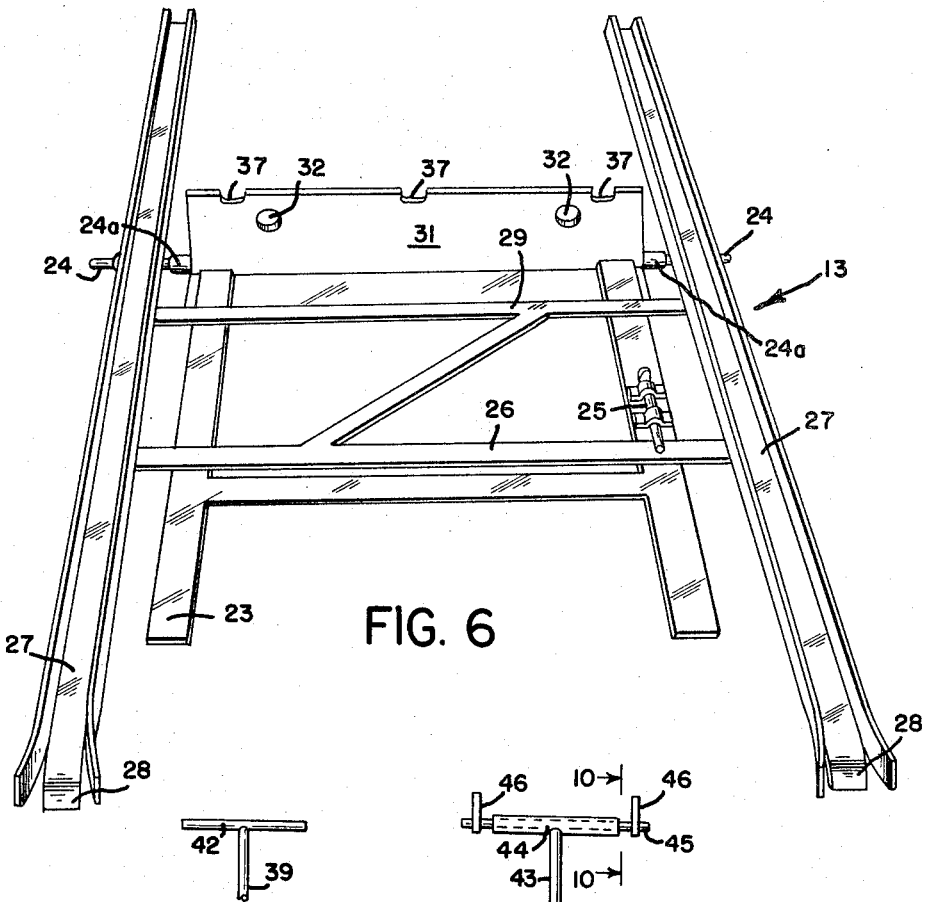
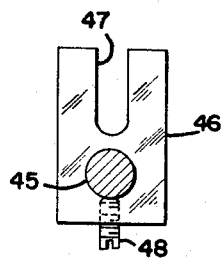
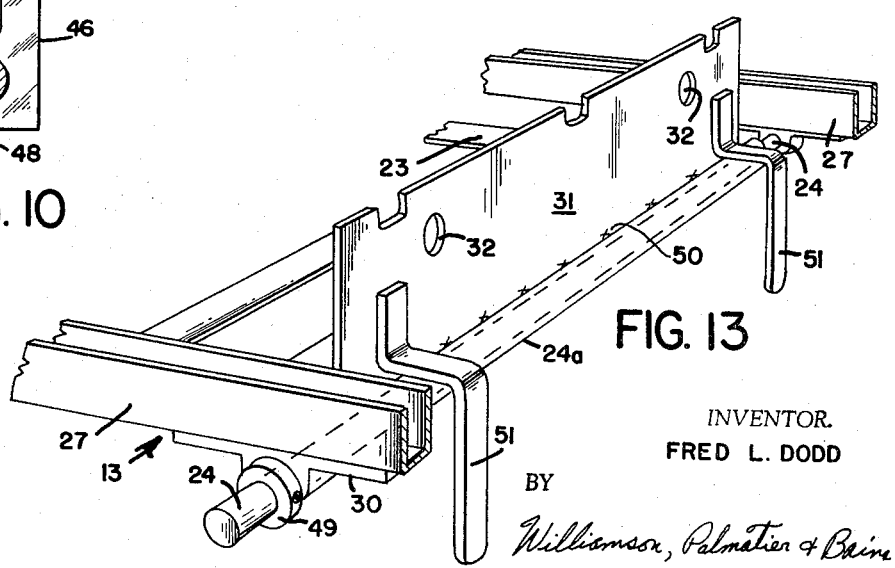
INVENTOR.
FRED L. DODD
BY
Williamson, Palmatier & Bains
ATTORNEYS

United States Patent Office 3,355,037
Patented Nov. 28, 1967

3,355,037
CARGO UNLOADING DEVICE
Fred L. Dodd, Minneapolis, Minn., assignor to Premium Corporation of America, Inc., Minneapolis, Minn., a corporation of Minnesota
Filed Aug. 1, 1966, Ser. No. 569,202
7 Claims. (Cl. 214—44)

This invention relates to a cargo unloading device and more particularly relates to a tilting unloading device which receives palletized loads and tilts the palletized load onto a ramp which allows the load to gently slide to ground level.

Often times, when loading or unloading cargo from a truck bed, a dock is not available and the truckdriver must somehow move the load to or from the truck bed to or from the ground. This is a particular problem when the truckdriver has received a load onto the bed of his truck and must, at the destination of the cargo being shipped, unload the cargo without the convenience of a dock. The dock allows the truckdriver to simply back up to and abut a dock which is at the same level as the truck bed. The truckdriver need only push the cargo from the truck bed onto the substantially coplanar dock.

Palletized packaging has greatly simplified the problems of the shipper. In many cases, palletized packaging has simplified the activities of the trucker. However, when a dock is not available, the trucker is presented with a considerably greater problem than he confronted prior to the convenience of palletized packaging. This is so because palletized cargo is typically too large to handle manually and the trucker must devise a way to conveniently unload his unitized cargo. Means presently available to unload palletized cargo include winches which must be mounted or anchored at ground level and then attached to the pallet to pull the pallet from the truck bed, onto a ramp, and subsequently to the ground. Other means available utilize a wheel-mounted pallet, which wheels engage matching channels which allow the load to descend to the ground. However, control over a heavy, wheel-mounted pallet which descends to the ground on wheels is difficult and sometimes impossible. Other means such as a live or dead roll conveyor are almost as cumbersome and difficult to handle when setting up as the palletized load is to unload.

With these comments in mind, it is to the elimination of these and other disadvantages to which the present invention is directed, along with the inclusion therein of other novel and desirable features.

An object of my invention is to provide a new and improved cargo unloading device of simple and inexpensive construction and operation.

Another object of my invention is to provide a novel cargo unloading device which provides controlled unloading of a palletized or unitary load from a truck bed to ground level.

Still another object of my invention is the provision of an improved and novel cargo unloading device which is extremely light in weight and which may be set up with a minimum of inconvenience to the trucker yet providing maximum work advantage when unloading palletized cargo from a truck bed to the ground.

A further object of my invention is the provision of a cargo unloading device which may be conveniently stored, when being transported, on the bed of the truck without interfering with the pallets loaded on the truck bed.

These and other objects and advantages of my invention will more fully appear from the following description made in connection with the accompanying drawings wherein like reference characters refer to the same or similar parts throughout the several views, and in which:

FIG. 1 is a diagrammatic sketch showing a typical usage of my cargo unloading device.

FIG. 2 is a side elevation view showing a portion of my cargo unloading device in position discharging a load with subsequent pallet positions shown in dotted lines.

FIG. 3 is a sectional view taken along the line 3—3 of FIG. 2.

FIG. 4 is a plan view showing the tilting cargo receiving portion of my cargo unloading device.

FIG. 5 is a sectional view taken along the line 5—5 of FIG. 4.

FIG. 6 is a perspective view of the tilting cargo receiving member and the ramp receiving member of my cargo unloading device.

FIG. 7 is a sectional view taken along the line 7—7 of FIG. 1.

FIG. 8 is a sectional view taken along the line 8—8 of FIG. 1.

FIG. 9 is a sectional view taken along the line 9—9 of FIG. 1.

FIG. 10 is a sectional view taken along the line 10—10 of FIG. 9.

FIG. 11 is a bottom view of the unloading ramp of my cargo unloading device.

FIG. 12 is a side elevation of the unloading ramp of my cargo unloading device.

FIG. 13 is a perspective view of the ramp receiving device.

One form of the present invention is shown in the drawings and is described herein. Referring to FIG. 1, my cargo unloading device is indicated by the numeral 10 as attached to a truck 11 on bed 12. My cargo unloading device includes a cargo tilting bed 13, an inclined ramp 14 with suitable outer supporting members 15 and a middle supporting and joining member 16. Means are provided to attach the ramp 14 to the cargo tilting bed 13. It should be noted that the cargo tilting bed 13 tilts somewhat upwardly from the trailer bed 12 to provide clearance of the cargo pallet over the terminal ramp portion, indicated at 17, at the point of attachment of the ramp 14 to the truck bed 12.

FIG. 2 shows, in detail steps cargo being unloaded from a truck. The cargo is palletized on a suitable pallet and is shown, in solid lines, in position on truck bed 12; and, in dotted lines, in several positions being unloaded from the truck 11 onto ramp 14. A palletized load is shown in solid lines on truck bed 12 and is indicated by numeral 18. The palletized load includes cargo 19 secured to a platform or skid 20 which may be constructed of wood or metal. Supporting skids 21 are attached to platform 20 by suitable means and a wheel assembly 22 is mounted on each corner of the platform 20. As shown, the palletized load 18 is at rest on truck bed 12 with skids 21 in contact with bed 12, and with wheels 22 spaced from bed 12 a distance indicated by the dimension X. In this way, the palletized load, when loaded on the truck bed, does not easily shift as if it were mounted on wheels. However, by simply lifting one end of the palletized load or cargo 18 the skids 21 may be raised off of the bed 12 thereby allowing wheel 22 to contact the bed and roll thereon. It should be noted that skids 21 are constructed of, typically, a high-wear, metal strap attached to platform 20 with wheels 22 spaced in line with the skids and at each end of the skids. Wheels 22 rotate about an axis transverse to the longitudinal skids. Tilting bed 13 is adapted to receive palletized loads and is shown with a palletized load 18a disposed thereon and shown in dotted lines. Wheels 22a and skids 21a are shown in engagement with the tilting bed 13 with tilting bed 13 in its rest or equilibrium position. The cargo 19a has not been tilted at this point and is under the control of the operator. Palletized cargo 18b is shown engaged in bed 13 after the bed 13 has been tilted. The palletized cargo 18b is now tilted downwardly in position to be received by the ramp 14. Palletized load 18c is shown with a leading portion of the pallet platform 20c engaged on ramp 14 and rear wheels 22c disposed on tilted bed 13. The leading edge of pallet platform 20c contacts the ramp 14 and a frictional force is exerted thereon at the point of contact, preventing the palletized load 18c from descending, out of control, along the ramp. Palletized load 18d is shown with the pallet platform 20d engaging the ramp 14 which contact places a frictional force on the load thereby preventing uncontrolled descent of the load on the ramp 14.

It should be noted that in each step shown, skids 21 and wheels 22 are disposed outside ramp 14 and essentially straddle the ramp. Skids 20 are simply for support of the load and to displace the load away from the ground to allow forklift trucks to pick up the load. Wheels 22 are spaced in line with skids 21 to provide ease of movement of the palletized loads.

FIG. 3 shows ramp 14 straddled by wheels 22 with the skids 21 disposed in back of wheels 22 and not shown in the drawing. Platform 20 is shown, along with the cargo 19. The platform 20 is shown spaced above ramp 14 since the section line from which the view was taken is immediately prior to the discharge of the entire palletized load 18b from tilting bed 13 onto the ramp 14.

FIG. 4 shows the attachment assembly of the tilting bed 13 to the truck bed 12. The tilting bed 13 includes a suitable mounting frame, indicated by numeral 23 which is secured to the truck bed 12 in any suitable manner, for instance, bolting or welding to the truck bed 12. The mounting structure 23 receives ramp 14 and is bolted thereto. A shaft 24 is rotatably mounted in sleeve 24a which is rigidly mounted on frame 23 and rotates about an axis generally parallel with the opening of the truck 11 which receives material to be transported. A conventional latch 25 is attached to mounting assembly 23 and is adapted to prevent tilting of the tilting mechanism 13 until desired. The latch 25 is readily available and simply comprises a slidable bolt adapted to engage a cross member 26 of the tilting mechanism which is joined to opposed parallel wheel receiving channel members 27. Wheel receiving channels 27 are typically constructed of a rigid metallic material and, in cross section, have a bottom portion and side rail portions. The channels 27 each have a flared inlet end, indicated at numeral 28, to facilitate receiving a palletized load. An additional cross member 29 is shown to provide proper spacing and strength to the opposed parallel wheel channel members 27. When latch 25 is released, the wheel engaging channels 27 will tilt, simultaneously, about shaft 24 when manipulated by an operator.

A detail of the pivot point and ramp receiving assembly is shown in FIG. 5. The mounting assembly 23 is shown with sleeve 24a welded thereto to contain shaft 24. Channels 27 are shown secured to the shaft 24 for rotation thereon. A mounting bracket or shaft receiving element 30 is shown affixed to channel member 28 and rotates on shaft 24. Mounting plate 23 includes a substantially upright plate portion 31 which is affixed to the mounting plate 23 and attached to the transverse sleeve 24a. The upright plate 31 includes apertures 32 adapted to receive a mounting assembly for ramp 14. A rigid angle element 33 is bolted transversely to ramp 14 by bolt assemblies 34 with a downwardly projecting leg 33a having an outwardly extending bolt or lug 35 welded thereto and adapted to be received into aperture 32. Nuts 36 may then be threaded onto bolt 35, securing the ramp 14 onto mounting frame 23 at suitable attachment apertures 32 spaced across the upright plate 31 of mounting frame 23.

In FIG. 6, the tilting bed 13 is shown in perspective as it would be seen by one standing on the truck bed facing the ramp. The ramp is secured to the upright bracket 31 at apertures 32. Upright bracket 31 is notched at 37 to provide clearance for the bolt assemblies 34 which attach the angle element 33 onto ramp 14. Opposed parallel channels 27 are shown with flared ends 28 adapted to receive wheels 22 or skids 21 of the palletized load. Mounting frame 23 is shown and includes a latch 25 adapted to secure the tilting channel assembly 27 in transport position. Channels 27 are mounted on shaft 24 which rotates in sleeve 24a.

FIG. 7 is a plan view of the ramp supporting members 15 which includes a tripod structure, indicated at 38, and a threaded shaft 39 disposed in an internally threaded sleeve 40 which shaft is actuated by conventional gear drive 41. The support 15 includes a T-shaped member 42 coextensive with shaft 39 adapted to be inserted into a receiving slot in ramp 14, the receiving slot disposed generally transversely and underneath the ramp. The T-shaped member 42 is shown in FIG. 8. Supporting and joining member 16, shown in FIG. 1, is similar to support 15 and includes components of the tripod assembly supporting member shown in FIG. 7 with a modified T-shaped member adapted to support and join abutting ramp portions. As shown in FIG. 9, T-shaped member 43 includes a sleeve portion 44 with a rotatable shaft 45 disposed therein. Ramp joining elements 46 are attached with set screws at each end of the shaft 45. Referring to FIG. 10, joining element 46 is shown in side view and includes a slot 47 adapted to join abutting ramp portions. The joining element is shown secured on shaft 45 by set screw 48.

Referring to FIG. 11, the ramp is shown as viewed from the bottom. A transverse slot 49 is adapted to receive T-member 42 for support of the ramp and to prevent movement of the supporting member 16. Angles 50 are attached to abutting ramp portions and, as shown in FIG. 12, have depending legs 51 adapted to be received by notch 47 into joining element 46. This prevents separation of the abutting ramp portions when unloading or loading cargo.

A portion of the tilting bed 13 is shown in FIG. 13 in perspective. Bracket 30 is shown rotatably mounted on shaft 24 with a collar 49 affixed on shaft 24 to retain shaft 24 in position in sleeve 24a which is affixed to upright plate 31 along the weld line indicated at 50. Bed engaging elements 51 are shown attached to upright plate 31 of the mounting frame 23 and comprise rigid, angulated bars affixed to, typically by welding, the upright plate. Bed engaging elements 51 provide additional stability for the frame 23 on the truck bed and prevent movement of the frame rearwardly on the truck bed when the ramp is in use. The ramp is attached at aperture 32 and, when loaded, exerts considerable force on plate 31 and in turn on frame 23.

In operation, my cargo unloader is set up by simply pulling the ramp portions from underneath the palletized loads which may be placed on the truck bed. The ramp is attached to the upright plate 31 with the supporting members located underneath the ramp and inserted in the ramp slots to prevent swaying of the tripod supports. The joining element of the middle supporting member engages the abutting angles of the ramp portions and supports and joins the ramp sections at this point. The latch 25 is then removed separating the channels 27 from the mounting frame 23 and allowing the channels to tilt about shaft 24. For unloading the load, a palletized load is gripped by the trucker and tipped upwardly to engage the wheels 22 on the truck bed 12 and allow the trucker to push the palletized load on the wheels. At the point of engagement of the wheels 22 with the truck bed 12, skids 21 are no longer in contact with the truck bed and therefore free movement of the palletized load is achieved. The trucker simply pushes the palletized load on the forward wheels into engagement with the flared ends 28 of the channels 27 and pushes the palletized load until it is completely on the channels. Since latch 25 is not engaged in contact with the tilting channels, the operator may tip the palletized load about shaft 24 as it is supported on channels 27. When the load is tipped, it clears upright plate 31 and may be pushed off of the channels and onto the ramp. Since the platform 20 of the palletized load engages the ramp and not the wheels or skids, more control is gained over the load since it must be slightly pushed as it is urged, mostly by gravity, down the inclined ramp.

The ramp supporting means may be adjusted to various heights by simply cranking the gear drive which raises or lowers the threaded shaft and T-shaped member.

From the foregoing it will be seen that I have provided a new and improved cargo unloading device of simple and inexpensive construction and operation and which further provides controlled unloading of a palletized load from a truck bed to ground level. Further, I have provided a cargo unloading device which may be adjusted to compensate for uneveness in the ground and thereby provide a ramp at a specific incline.

My ramp is of such construction that it may be easily separated into portions and stored under the pallets loaded on the trucks. The ramp is of such width, that it is less wide than the distance between each of the skids of a pallet and, consequently, the ramp portions may be slid under the platform of the pallets and between the skids of the pallets.

My cargo unloading device is designed specifically to receive a palletized load which is on skids or on wheels. The skids or wheels engage channels in the tilting bed mechanism and are retained therein in that there is a frictional foarce between the skids and the lower portions of the channels. This allows the operator to maintain a high degree of control over the load as as he unloads it from the truck bed. However, the tiltable channels in my ramp may be varied in size and width to suit most style pallets and pallets without wheels as well. The construction of my cargo unloading device makes it particularly useful in an area in which there are either no docks which are not of a height equal to the truck bed.

It will, of course, be understood that various changes may be made in the form, details, arrangement and proportions of the various parts without departing from the scope of my invention.

What is claimed is:

1. A cargo unloading device adapted to unload palletized cargo from a truck having a bed and a rearward opening, said cargo unloading device comprising,
    a cargo receiving bed adapted to be affixed to the bed of a truck, said cargo receiving bed tiltable about an axis disposed generally horizontal relative to the truck bed and generally parallel with the rearward opening of the truck, said cargo receiving bed adapted to receive palletized cargo from the truck bed and tilt about the axis thereof providing an incline urging the palletized cargo generally downwardly,
    a ramp co-operable with said tiltable cargo receiving bed and adapted to receive palletized cargo therefrom, said ramp adapted to be attached at the rearward opening of the truck and extend to a predetermined level to permit said cargo receiving bed in its tilted position to urge palletized cargo onto said ramp for controlled descent from the truck bed to the predetermined level, said ramp having means receiving ramp supports and
    a plurality of ramp supports co-operable with the means receiving ramp supports whereby the ramp is supported at predetermined intervals between the level of the truck bed and the predetermined level at which the cargo is unloaded, said ramp supports having means adjusting the vertical dimension to permit compensation for irregularities in the level at which the cargo is to be unloaded.

2. The cargo unloading device of claim 1 wherein said cargo receiving bed includes,
    a pair of opposed parallel channels spaced apart a predetermined distance and adapted to receive the skids of a palletized load, said channels aligned substantially along the longitudinal axis of the truck and tiltable about an axis disposed generally horizontal relative to the truck bed and generally parallel with the rearward opening of the truck.

3. The cargo unloading device of claim 1 including,
    a mounting framework adapted to be affixed to the bed of the truck, said mounting framework adapted to receive said cargo receiving bed for tiltable movement thereon, and said mounting framework including a latch co-operable with said cargo receiving bed to permit locking of said cargo receiving bed in a predetermined position thereby preventing tilting movement of said cargo receiving bed.

4. The cargo unloading device of claim 1 including
    a ramp co-operable with said tiltable cargo receiving bed, said ramp including ramp sections each section having abutting means to permit support and joinder of the sections at the joint thereof and
    ramp supports co-operable with the ramp section abutting means to permit support and joinder of ramp sections along the joint thereof.

5. The cargo unloading device of claim 3 wherein said mounting framework includes
    an upright bracket disposed generally transversely of the longitudinal axis of the truck and extending upwardly substantially alongside the rearward opening of the truck, the upright bracket having means receiving said ramp and, truck bed engaging elements affixed to said upright bracket, said truck bed engaging elements adapted to engage the edge of the truck bed to provide stability to the mounting frame and cargo receiving bed under stress exerted by a palletized load descending on said ramp.

6. The cargo unloading device of claim 3 wherein said cargo receiving bed is tiltably mounted on an axis disposed generally horizontal relative to the truck bed and generally parallel with the rearward opening of the truck, the axis provided by a sleeve affixed to the upright bracket of said mounting framework and a shaft rotatable therein, the shaft connected with said cargo receiving bed whereby said cargo receiving bed is tiltable about the shaft.

7. The cargo unloading device of claim 4 wherein said ramp supports include means whereby abutting ramp sections may be supported and joined.

References Cited

UNITED STATES PATENTS

| | | | |
|---|---|---|---|
| 1,910,398 | 5/1933 | Ludington | 214—85 |
| 2,786,563 | 3/1957 | Stuart | 193—41 |
| 3,159,294 | 12/1964 | Forsythe | 214—85 |

ANDRES H. NIELSEN, *Primary Examiner.*